Patented May 31, 1932

1,860,553

UNITED STATES PATENT OFFICE

ELOI RICARD AND HENRI MARTIN EMMANUEL GUINOT, OF MELLE, FRANCE, ASSIGNORS, BY MESNE ASSIGNMENTS, TO U. S. INDUSTRIAL ALCOHOL CO., OF NEW YORK, N. Y., A CORPORATION OF WEST VIRGINIA

PROCESS FOR THE EXTRACTION IN THE ANHYDROUS STATE OF FATTY ACIDS CONTAINED IN DILUTE AQUEOUS SOLUTIONS

No Drawing. Application filed June 9, 1927, Serial No. 197,763, and in Belgium July 1, 1926.

It is a known fact that the fatty acids and particularly acetic acid may be extracted from their dilute aqueous solutions by suitable solvents, this being an operation which pertains to the general methods employed in organic chemistry and it is also a known fact that such solvents must be insoluble in water, for otherwise it would be impossible to effect such separation.

However the small efficacy of the solvents in use, as well as certain other disadvantages, have proved the main obstacle to the industrial use of processes based upon this principle. In fact, the sulphuric ether prescribed for the treatment of acetic acid solutions, which boils at 34.5 degrees C. requires great precautions in order to reduce the loss occasioned by the constant manipulation of large quantities of the ether, which is relatively expensive and difficult to condense.

The substances containing chlorine, such as chloroform or carbon tetrachloride which are also used for this purpose, are poor solvents. Moreover they have the serious defect of becoming hydrolyzed after a certain time, with the formation of hydrochloric acid which damages the apparatus.

As concerns hydrocarbons such as benzene, toluene and the like, these are defective solvents as is shown by the fact that they have been employed to remove the impurities from pyroligneous acid, such as tars and phenol substances, which they dissolve while leaving a purified solution of crude acid. This shows that it is not sufficient that a liquid shall be insoluble in water in order that it may form a suitable solvent for the extraction of acetic acid or the like.

We have ascertained that by the use of the esters of acetic acid particularly good results will be obtained in the extraction of the fatty acids from these dilute solutions, and this use will represent a great progress in this branch of manufacture. The following advantages are offered by the use of such esters:

1. They have a great power of extraction, thus requiring a minimum amount of the solvent. For instance butyl acetate has a dissolving power for acetic acid which is 6 to 8 times that of benzene or carbon tetrachloride.

2. Since the mean boiling points are 77–125 degrees C., this provides for a ready recovery of the products and a minimum loss during the operations.

3. A strictly anhydrous acid can be directly obtained with a suitable output, since the acetates do not form azeotropic mixtures with the fatty acids, such as the latter produce with the hydrocarbons or with certain derivatives containing chlorine. On the other hand, they are capable of being employed to form azeotropic mixtures with water.

The invention consists in a combined process in which acetic ester acts as solvent in an extraction stage, and as an agent for the removal of water in a stage of azeotropic distillation. In this way, the acid is not merely concentrated but is obtained from dilute aqueous solutions in an anhydrous condition, and the recovery is high.

*Example I.*—A dilute 10 percent solution of acetic acid is treated with an equal volume of ethyl acetate. By operating in an apparatus adapted for systematic exhaustion, we finally remove the whole of the acetic acid from the aqueous solution and the whole amount of acid is caused to enter the ethyl acetate which dissolves at the same time about 3 per cent of water. By distilling this acetic solution by the azeotropic method, there will be first formed a binary mixture of ethyl acetate and water having a minimum boiling point and distilling at 70.4 degrees C. as a liquid which separates into layers, and when the water has been entirely removed, the anhydrous ethyl acetate is then distilled at 77 degrees, without bringing over the acetic acid. This latter is collected in the strictly anhydrous state, and at nearly the theoretical output.

*Example II.*—A solution of normal butyric acid of 5 degrees strength is treated in apparatus adapted for systematic exhaustion, with half its volume of butyl acetate. This affords a 10 per cent solution of butyric acid in the butyl acetate, and the aqueous solution is entirely exhausted.

The subsequent distillation of the solvent will produce a distillate containing water which is rapidly expelled due to the existence of a mixture with minimum boiling point distilling at 92 degrees C. The butyl acetate which boils at 125 degrees can then be readily removed from the anhydrous butyric acid which distils in the last place; its boiling point being 160 degrees.

The examples are not limitative, and the method is applicable even in the case of a mixture of fatty acids. The esters may be used singly or in mixture.

If the percentage of acid in the aqueous solution under treatment exceeds a certain limit, the method may offer little advantage owing to the increase in the solubility of the extracting agent in said aqueous solution and also in the solubility of the water in the upper acid layer of the solvent.

This defect can be obviated by adding to the ester used as the principal extracting agent a certain amount of a hydrocarbon having a suitably chosen boiling point, such as benzene, toluene or xylene, or hydrocarbons having restricted boiling points obtained from petroleum. The proportion of the hydrocarbon to be added will depend upon the strength of the acid solution. To offset this diminution in the reciprocal solubilities, the proportion of acid in the solvent becomes less. In fact, the action is such as would be expected if the ester and hydrocarbon mixture had formed a new chemical body possessing its own solubility and dissolving power. Since such mixtures may be indefinitely varied, we may preliminary prepare, for each strength or each kind of acid, the mixture or mixtures which are preferable as concerns the consumption of steam for the evaporation of the extracting agent while leaving a residue of anhydrous acid, and for expelling from the exhausted aqueous solution the extracting agent dissolved therein.

*Example III.*—This relates to the treatment of an acetic acid solution at 200 grams per liter, in which ethyl acetate is quite soluble, or at the rate of over 20 per cent.

We may employ the following mixture:—

|  | Parts |
|---|---|
| Ethyl acetate | 75 |
| Benzene | 25 |

By the systematic exhaustion with this extracting agent, we can obtain a residual water which is practically free from acid and contains in solution 3,6 per cent of the ester and hydrocarbon mixture. The minimum amount of acid in the upper layer of solvent is 135 grams per liter and the amount of dissolved water is 4,6 per cent.

The solvent is preferably evaporated in a continuous manner in a distilling apparatus of the upright type containing about ten plates. The product to be distilled is supplied to the top of the apparatus. The water is first distilled as well as the solvent to be recovered; the latter when distilled is practically free from acetic acid owing to the presence of a large proportion of ethyl acetate, so that the material need not be returned to the distilling apparatus. The anhydrous acid is removed at the bottom of the apparatus.

What we claim is:

1. In a process for the removal in the anhydrous state of the lower fatty acids contained in dilute aqueous solutions, the steps which consist in the exhaustion of such solutions with an acetic ester, and distilling the resulting liquids which contain the acid in solution in the acetic ester and a certain amount of water, having present sufficient of the acetic ester to remove the water which is distilled over in the first place, owing to the formation of a binary mixture of water and the ester which has a minimum boiling point.

2. A process for the removal in the anhydrous state of the lower fatty acids contained in dilute aqueous solutions, which consists in the exhaustion of such solutions with an acetic ester, in distilling the resulting liquids which contain the acid in solution in the acetic ester and a certain amount of water, having present sufficient of the acetic ester to remove the water which is distilled over in the first place, owing to the formation of a binary mixture of water and the ester which has a minimum boiling point, and in continuing the distillation in order to remove the ester and to obtain finally the anhydrous acid.

3. A process for the removal in the anhydrous state of the lower fatty acids contained in dilute aqueous solutions which consists in the exhaustion of such solutions with an acetic ester to which is added a liquid hydrocarbon adapted to minimize reciprocal solubilities of the solvent and water, in distilling the resulting liquids which contain the acid in solution in the acetic ester with a certain amount of water, in removing from this mixture the water which is distilled over in the first place due to the formation of a binary mixture of water and the said acetic ester having a minimum boiling point, and in continuing the distillation in order to remove the ester and to obtain finally the anhydrous acid.

In testimony whereof we have signed this specification.

ELOI RICARD.
HENRI MARTIN EMMANUEL GUINOT.